United States Patent [19]
Bitterman et al.

[11] 3,990,420
[45] Nov. 9, 1976

[54] AIR INDUCTION VALVE

[76] Inventors: Edward P. Bitterman, 1247 Viola St.; Edwin J. Budge, 1811 W. Mountain St., both of Glendale, Calif. 91201

[22] Filed: Nov. 22, 1974

[21] Appl. No.: 526,120

[52] U.S. Cl. .................. 123/119 D; 123/119 B; 137/517; 137/480
[51] Int. Cl.² ........................................ F02M 23/00
[58] Field of Search ...... 123/119 B, 119 D, 119 DB, 123/124 R, 97 B; 137/511, 517, 522, 480; 261/DIG. 19, DIG. 1

[56] References Cited
UNITED STATES PATENTS

| | | | |
|---|---|---|---|
| 1,070,131 | 8/1913 | Holton | 123/119 D |
| 2,454,480 | 11/1948 | Rossman | 123/119 D |
| 3,693,650 | 9/1972 | MacGuire | 123/119 D X |
| 3,756,270 | 9/1973 | Fonseca et al. | 123/119 D X |
| 3,799,132 | 5/1974 | MacGuire | 123/119 D |
| 3,809,035 | 5/1974 | Winton | 123/119 D X |

*Primary Examiner*—Charles J. Myhre
*Assistant Examiner*—Ira S. Lazarus
*Attorney, Agent, or Firm*—Eugene C. Ziehm

[57] ABSTRACT

An air induction valve adapted to introduce controlled amounts of additional air to the combustion chamber of an automotive engine when engine vacuum is low, which includes a hollow cylindrical casing having a chamber in communication with the intake manifold of the engine and with ambient air. A pair of perforated partition plates are disposed in parallel spaced apart relationship in the casing, with value means being provided between the partition plates, the valve means being vertically moveable between the plates in response to engine vacuum. Compression springs are provided between the valve means and the partition plates, with the valve means being normally biased open. When the automotive engine is operating under conditions resulting in high engine vacuum, the valve means is displaced to prevent the flow of ambient air through the air induction valve. When the engine is operating under conditions resulting in a low engine vacuum, the valve means is urged to an open position to provide an annular air passage around the valve means and permit the introduction of controlled amounts of ambient air through the air induction valve into the combustion chamber to provide a more efficient air-fuel mixture under such conditions.

5 Claims, 5 Drawing Figures

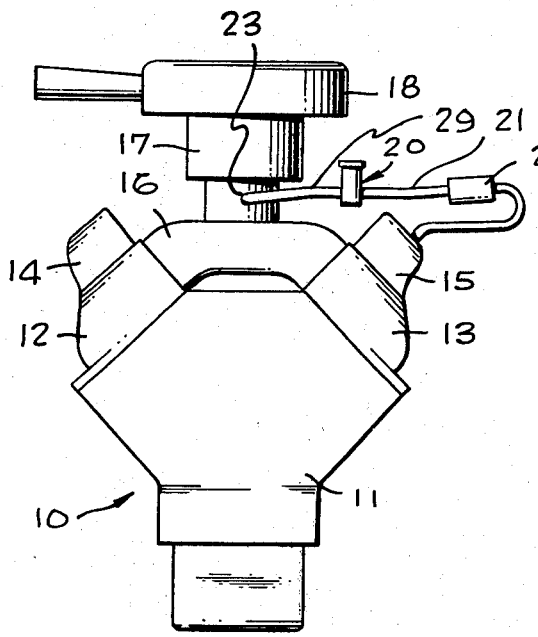
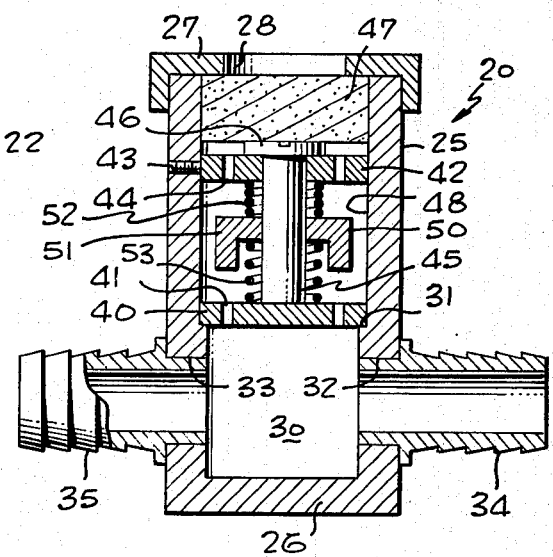
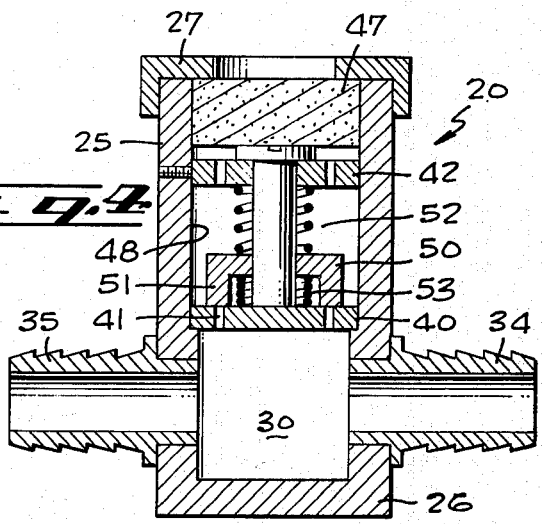
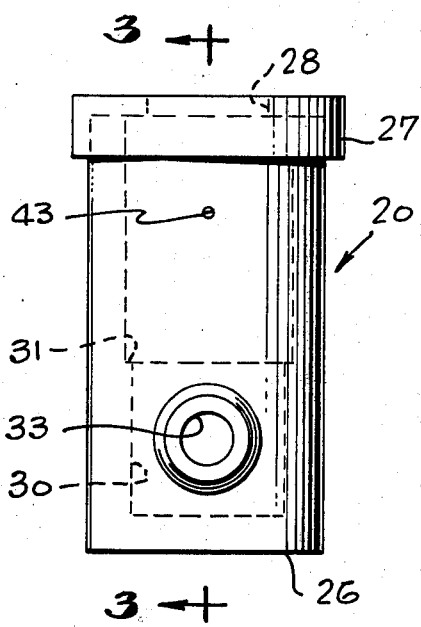
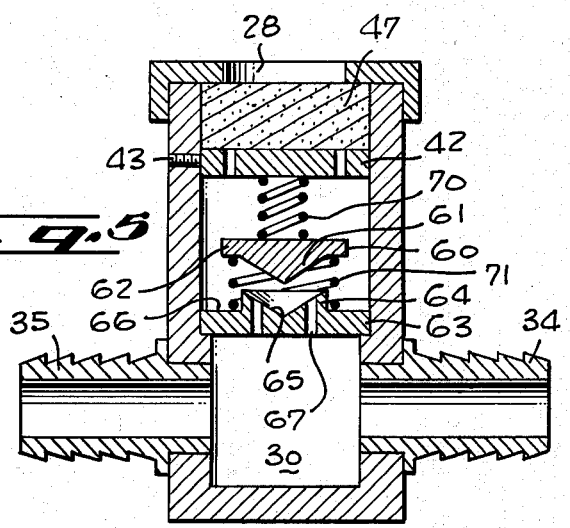

AIR INDUCTION VALVE

BACKGROUND OF THE INVENTION

1. Field of the Invention

This invention relates to an air induction valve, and particularly to an air induction valve adapted to increase the efficiency of an internal combustion engine when operating at high speeds or under heavy loads.

2. Description of the Prior Art

Heretofore, considerable difficulty has been encountered in effecting complete and efficient combustion of air-fuel mixtures in automotive engines throughout all engine loads and speeds. Efficient combustion is greatly dependent on the air-fuel ratio delivered to the combustion chamber of an engine during its operation. Automotive engines are subject to a variety of operating conditions, such as idling, accelerating, decelerating, cruising at low and high speeds, negotiating hills and mountains, pulling loads, and the like. Under such varying conditions, varying proportions of fuel and air must be provided to the combustion chamber to accomplish proper and complete combustion. However, conventional carburetors cannot effectively provide the proper air-fuel mixture required for efficient combustion, under such varying operating conditions. Thus, most conventional carburetors are set to provide a proper air-fuel mixture for idling, accelerating and cruising at low-to-medium speeds, conditions under which manifold vacuum is usually about 18 or more inches of mercury. However, under conditions which result in low engine vacuum, that is, less than about 10 inches of mercury, such as operating at high speeds, negotiating hills and mountains, pulling heavy loads, and the like, the combustion chamber requires additional fuel. While increased amounts of gasoline are fed into the combustion chamber, under these conditions the amount of air in the mix is fixed, resulting in an overly rich mixture of fuel and air. As a result, there is incomplete combustion of the fuel, resulting in wasted fuel and unburned hydro-carbons which are expelled into the atmosphere causing air pollution. While a number of devices have been suggested heretofore to correct this problem, such prior devices have generally been ineffective, too expensive or unsatisfactory for a number of other reasons.

SUMMARY OF THE INVENTION

The present invention provides an air induction valve adapted to increase the amount of air in the combustion chamber under those conditions which have in the past resulted in an overly rich air-fuel mixture. Thus, the valve permits a controlled amount of additional air to be admitted to the combustion chamber under those conditions which result in a low engine vacuum, that is, 10 inches or less of mercury, to provide a proper air-fuel mixture for efficient combustion.

The valve of this invention, which is adapted to be installed in the crankcase vent hose between the Positive Crankcase Ventilation valve and the base of the carburetor, includes a hollow cylindrical casing containing a pair of perforated partition plates fixedly secured within the casing in parallel, spaced apart relationship to one another to define a valve chamber between the plates, the valve chamber being in communication with the atmosphere and with the combustion chamber. A spring-loaded valve body is slidably mounted in the valve chamber. The valve body is responsive to variations in engine vacuum as the result of variations in engine speed and load, so that upon the creation of a high vacuum within the combustion cylinder, the valve is urged to a closed position and upon the creation of a low vacuum, the valve plate is urged to an open position to permit the flow of a controlled amount of air from the atmosphere through the air induction valve into the combustion chamber. Thus, under conditions which cause a low vacuum in the combustion chamber and which result in increased amounts of fuel being fed into the combustion chamber, the air induction valve of this invention permits the introduction of additional, controlled amounts of air to the combustion chamber to provide a more efficient air-fuel mixture.

BRIEF DESCRIPTION OF THE DRAWING

FIG. 1 is an end elevational view of an automotive internal combustion engine with the air induction valve of the present invention operatively associated therewith.

FIG. 2 is a side elevational view of the air induction valve of this invention.

FIG. 3 is a cross-sectional view taken along line 3—3 FIG. 2, and shows the valve in an open position.

FIG. 4 is a cross-sectional view taken along line 3—3 of FIG. 2 and shows the valve in a closed position.

FIG. 5 is a cross-sectional view showing another embodiment of the air induction valve of the present invention.

DESCRIPTION OF THE PREFERRED EMBODIMENT

Referring now more specifically to the drawings, the numeral 10 generally indicates an internal combustion engine including a block 11, cylinder heads 12 and 13, topped by rocker arms 14 and 15, respectively. An intake manifold 16 is mounted between the cylinder heads and supports a conventional carburetor 17 topped by an air cleaner 18. The air induction valve of the present invention is referred to in general by reference numeral 20. As shown in FIG. 1, air induction valve 20 is disposed intermediately of the positive crankcase ventilation valve 22 and the base of the carburetor which communicates with the combustion cylinders. Inlet tube 21 connects the air induction valve to the PCV valve 22 and outlet tube 29 leads from the air induction valve 21 to a passage 23 opening into the base of the carburetor and the air and fuel passages therein so that the air induction valve is in communication with the combustion cylinders and intake manifold.

The air induction valve comprises a generally cylindrical body 25 constructed of a durable material such as aluminum or the like. Cylindrical body 25 is formed with a bottom wall 26 and is provided with a cap 27, having an opening 28 therein to permit the flow of ambient air into the body 25. Cap 27 is frictionally engaged with the walls of the cylindrical body to provide a cylindrical chamber 30 within body 25. A shoulder 31 is formed intermediately of the bottom wall 26 and cap 27. Inlet openings 32 and outlet opening 33, coaxially aligned with the inlet opening, are provided in the walls of the cylinder adjacent the bottom wall, with tubular fittings 34 and 35 being frictionally engaged in openings 32 and 33, respectively, to provide an aligned axial passageway through the lower portion of the chamber 30. Tubular fitting 34 is connected by line 21 to the PCV valve, while tubular fitting 35 is connected by line 29 to the base of the carburetor so that the chamber 30 is in communication with intake manifold 16.

As shown in FIGS. 3 and 4, circular partition plate 40 is carried by shoulder 31, the partition plate being provided with a plurality of openings 41 around the circumference of the plate. An upper, circular partition plate 42 is spaced above plate 40, parallel thereto, and is secured by set screw 43 which extends through the cylinder wall. Partition plate 42 is also provided with a plurality of openings 44 around the circumference of the plate to permit the flow of air therethrough. Openings 44 and 41 are distributed so that the flow of air therethrough will be substantially uniform over the cross-sectional area of the chamber 30. The parallel, spaced apart partition plates define a valve chamber 48 therebetween, the valve chamber being in communication with the atmosphere and with the intake manifold of the engine. Stem 45 extends through the upper partition plate to the upper surface of lower partition plate 40, the stem being secured in position by screw 46. A porous air filter 47 is disposed between upper partition plate 42 and cap 27 to filter the air passing from the atmosphere into chamber 30.

A valve body 50, provided with an integral depending flange 51 is disposed in the valve chamber, being carried by stem 45, and is mounted for vertical movement on the stem in response to changes in engine vacuum as will be described more fully herein below. As shown in FIGS. 3 and 4, the diameter of valve body 50 is smaller than that of valve chamber 48 to provide an annular air passage around the valve body. Depending flange 51 is adapted to close openings 41 in lower partition plate 40 when valve plate 50 is moved to its lower-most position on the stem. A pair of light, carefully adjusted compression springs 52 and 53 are provided on the stem above and below the valve body, respectively, so that the valve body is normally biased open, as shown in FIG. 3, and to facilitate vertical sliding movement of the valve body on the stem. Upper compression spring 52 prevents the valve body from closing the openings 44 in upper partition plate 42, while, as noted above, depending flange 51 on the valve plate is adapted to close the openings 41 in lower partition plate 40.

With the foregoing arrangement, it will be seen that when the engine is turning over slowly, operating at low-to-medium speeds or is operating under other conditions which cause a high vacuum in the combustion cylinders, the high vacuum, usually 18 or more inches of mercury, is communicated via tube 29 to chamber 30 is sufficient to overcome the force of lower compression spring 53 so that valve body 50 is drawn down against lower partition plate 40 closing off the openings 41 in the partition plate, as shown in FIG. 4. Under such conditions only blowby fumes, drawn from the crankcase through line 21, pass through chamber 30 for reintroduction into the engine.

However, when the engine is operating under conditions which cause a low vacuum in the combustion cylinders, that is, less than about 10 inches or less of mercury, such as operating at high speeds, negotiating hills and mountains, pulling heavy loads, and the like, the force of compression spring 53 is sufficient to push valve body 50 away from lower partition plate 40 thereby uncovering openings 41, as shown in FIG. 3. Under such conditions ambient air is drawn into the air induction valve, the air being drawn through opening 28 in cap 27, openings 44 in upper partition plate 42, valve chamber 48, openings 41 in lower partition plate 40 and into chamber 30 where the ambient air mixes with the blowby fumes and is introduced through line 29 into the base of the carburetor. In this manner a controlled amount of additional air is admitted into the combustion chamber under those conditions which normally produce an overly rich mixture of fuel and air to provide a more efficient air-fuel mixture for combustion. As a result there is less wasted fuel and unburned hydrocarbons under those conditions which result in low engine vacuum.

FIG. 5 illustrates another embodiment of the air induction valve of the present invention. In this embodiment, the valve body 60 is provided with a downwardly extending conical portion 61 and an annual flange 62, said flange and conical portion being formed integrally. Lower circular partition plate 63, which rests on shoulder 31, includes an upraised central section 64 provided with a downwardly extending conical valve seat 65 and an annular flange 66. The conical valve seat 65 is provided with a plurality of openings 67 extending through the partition plate around the circumference of the conical portion. Upper compression spring 70 extends between the upper surface of the valve body and the lower surface of the upper partition plate 42. Lower compression spring 71 extends between the annular flanges 62 and 66. The compression springs 70 and 71 serve to bias the valve body in a normally open position, as shown in FIG. 5. The springs also stabilize laterally the valve body both during and subsequent to displacement thereof and provide a positive force which assists movement of the valve body in response to engine vacuum. Under conditions of high engine vacuum, the vacuum, which is communicated to chamber 30, is sufficient to overcome the force of compression spring 71 and displace valve body 60 into contact with the valve seat 65. Openings 67 are thereby closed preventing the flow of ambient air through the air induction valve. As engine vacuum is reduced, compression spring 71 is able to overcome the vacuum and urge valve body 60 away from the valve seat 65 thereby uncovering openings 67 and permitting the flow of additional ambient air through the air induction valve into the combustion chamber. It will be seen that as engine vacuum is reduced and valve body 60 is displaced away from seat 65, increased amounts of air will be permitted to flow through the air induction valve. Thus the amount of additional air flowing through openings 67 will vary in accordance with the displacement of valve body 60 from valve seat 65, which is in accordance with engine requirements due to vacuum manifold conditions. In this manner, an increasing amount of additional air is thereby provided to the engine intake in proportion to vacuum at the engine intake.

We claim:

1. An air induction valve for introducing controlled amounts of air to the carburetor of an internal combustion engine, which comprises a cylindrical casing having a bottom wall at one end thereof and a cap removably secured to the opposite end thereof to provide a chamber within the casing, said cap having an opening therethrough to permit the flow of ambient air into said chamber, said casing having a pair of axially aligned openings adjacent said bottom wall, one of said openings being in communication with the base of the carburetor so that engine vacuum is transmitted to said chamber, a lower, circular partition plate disposed intermediately of said bottom wall and said cap across the chamber, said lower partition plate having a plurality of openings therethrough around the circumference of the plate, an upper, circular partition plate having a plurality of openings therethrough around the circumference of the plate, means securing said upper partition plate in parallel, spaced apart relationship to said lower partition plate to provide a valve chamber between said lower and upper partition plates, a porous air filter disposed between the upper partition plate and said cap, valve means disposed in said valve chamber, said valve means being mounted for vertical movement in the valve chamber and having a portion adapted to close the openings in said lower partition plate when the valve is in its lowermost position in the valve chamber, the valve means having a diameter smaller than the diameter of the valve chamber, an upper compression spring disposed between said valve means and said upper partition plate, and a lower compression spring disposed between said valve means and said lower partition plate, said upper and lower compression springs being adapted to permit the valve means to move to its lowermost position in the valve chamber when engine vacuum is high and to move the valve means away from the lower partition plate when engine vacuum is low.

2. The air induction valve of claim 1 in which said upper and lower compression springs are adapted to permit said valve means to move to its lowermost position in the valve chamber when engine vacuum is 18 or more inches of mercury and to move the valve means away from the lower partition plate when engine vacuum is 10 or less inches of mercury.

3. The air induction valve of claim 1 in which the chamber within the casing is provided with a shoulder formed intermediately of the bottom wall and the cap, and said lower partition plate is disposed on said shoulder.

4. The air induction valve of claim 1 in which stem means is vertically disposed in said valve chamber between said upper and lower partition plates and said valve means is slidably disposed on said stem means, said valve means having a downwardly depending flange adapted to close the openings in said lower partition plate when the valve is in its lowermost position in the valve chamber.

5. The air induction valve of claim 1 in which said lower partition plate includes a downwardly extending conical valve seat having a plurality of openings therethrough and said valve means is provided with a downwardly extending conical portion adaptedd to close the openings in said lower partition plate when the valve is in its lowermost position in the valve chamber.

* * * * *